3,155,487
METHOD OF KILLING WEEDS
Llewellyn W. Fancher, Lafayette, and Arthur M. Imel, El Sobrante, Calif., assignors to Stauffer Chemical Company, New York, N.Y., a corporation of Delaware
No Drawing. Original application Nov. 24, 1959, Ser. No. 855,018. Divided and this application Jan. 16, 1962, Ser. No. 166,680
3 Claims.  (Cl. 71—2.5)

This invention relates to 2,4-dialkoxy-6-mercaptoaryl-s-triazines. More particularly the invention relates to compounds of the following general formula:

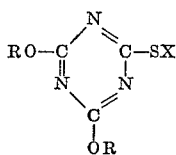

wherein each R is an identical lower alkyl radical and X is an aromatic radical, substituted or unsubstituted.

The compounds of the present invention can be made in the following manner:

EXAMPLE 1

2,4-Dimethoxy-6-p-Tolyl Mercapto-s-Triazine

Seven and seven-tenths grams (0.062 M) of p-thiocresol was dissolved with warming in 20 cubic centimeters of dioxane. To this solution was added with stirring 3.5 cubic centimeters (0.062 M) of 48 percent sodium hydroxide solution and the mixture cooled to 40° C. With rapid stirring, 10.5 grams (0.06 M) of 2,4-dimethoxy-6-chlorotriazine was added all at once. The temperature rose to 60° C. After the initial reaction had subsided, the mixture was heated on the steam-bath for one-half hour, then poured into cold water. The precipitated solid was filtered off, washed with water and air dried. By this procedure there was obtained 15.2 grams (97 percent of theory) of 2,4-dimethoxy-6-(p-tolyl)mercapto-s-triazine. M.P. 85.5–86.5° C.
Analysis:

|  | Percent N | Percent S |
|---|---|---|
| Estimated | 15.9 | 12.1 |
| Found | 15.6 | 12.1 |

EXAMPLE 2

2,4-Diethoxy-6-Phenylmercapto-s-Triazine

Using essentially the same procedure as in Example 1, except that the product being liquid was recovered by use of a solvent, 2,4-diethoxy-6-phenylmercapto-s-triazine was prepared from 6.6 grams (0.06 M) of thiophenol, 2.4 grams of sodium hydroxide dissolved in 5 cubic centimeters of water, 25 cubic centimeters of dioxane and 10.2 grams (0.05 M) of 2,4-diethoxy-6-chlorotriazine. The yield was 11.8 grams (85 percent of theory).

$$n_D^{30} = 1.5623$$

Using analogous procedures and various combinations of 2,4-dialkoxy-6-chlorotriazines and mercaptans or thiophenols, additional members of this class of compounds were prepared:

| R | X | $n_D^{30}$ or M.P. |
|---|---|---|
| Methyl | Phenyl | 53–58° C. |
| Do | m-Tolyl | 1.5904 |
| Do | Beta-napthyl | 1.6420 |
| Do | p-Tolyl | 97.5–107° C. |
| Do | o-Tolyl | 1.5912 |
| Ethyl | p-Tolyl | 1.5905 |
| Do | m-Tolyl | 1.5917 |
| Do | o-Tolyl | 1.5878 |
| Do | Beta-napthyl | |
| Isopropyl | Phenyl | 1.5955 |
| n-Propyl | do | 1.5602 |
| Do | p-Tolyl | 1.5940 |
| Do | m-Tolyl | 1.5853 |
| Do | o-Tolyl | 1.5886 |
| Do | Beta-naphthyl | 1.6432 |
| n-Butyl | Phenyl | 1.5199 |
| Do | p-Tolyl | 1.5822 |
| Do | m-Tolyl | 1.5740 |
| n-Octyl | Phenyl | 1.5285 |

The compounds of the present invention have been tested as herbicides and found very effective as the following typical tests show. Some of the compounds are quite selective in their action and can be used to eradicate or control one type of plant, while another type of plant is relatively unaffected.

In making the following tests, seeds were planted in 3″ pots and shortly thereafter the compound under test was applied to the pots as a drench at the rate of 235 pounds per acre. The pots were placed in a greenhouse and watered at suitable intervals and the germination and growth of the seeds was compared with similarly planted seeds to which no herbicide was added. In each case, germination was reported on the scale of 0–100%, while growth was reported on a scale of 0–10, based on the seeds which germinated. Thus, 100–10 indicates normal germination and normal growth.

The following data were obtained.

PRE-EMERGENCE HERBICIDE TESTS

| Oats | | Cucumber | | Radish | | R | X |
|---|---|---|---|---|---|---|---|
| $Ge_1$ | $Gr_2$ | Ge | Gr | Ge | Gr | | |
| 100 | 3 | 0 | | 0 | | Methyl | Phenyl. |
| 100 | 0 | 25 | 6 | 100 | 5 | Ethyl | Do. |
| 25 | 1 | 0 | | 0 | | Methyl | Meta tolyl. |
| 75 | 4 | 50 | 3 | 25 | 2 | do | Para tolyl. |
| 100 | 5 | 0 | | 0 | | do | Ortho tolyl. |

$Ge_1$—Germination.
$Gr_2$—Growth.

Further tests were made with 2,4 dimethoxy-6-orthotolyl mercapto-s-triazine and 2,4 dimethoxy-6-phenyl mercapto-3-triazine except that the rate of application was reduced to 10 lbs. per acre. Both of these compounds completely prevented the germination of redroot pigweed, Lamb's-quarters, purslane and smartweed even at this low concentration.

This application is a divisional application of application S.N. 855,018, filed November 24, 1959, now abandoned.

We claim:
1. The method of killing weeds comprising applying to soil the phytotoxic amount of

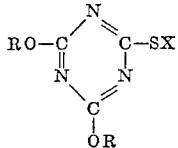

wherein R is lower alkyl and X is selected from the group consisting of naphthyl, phenyl and tolyl.

2. The method of killing weeds comprising applying to soil the phytotoxic amount of 2,4-dimethoxy-6-orthotolyl mercapto-s-triazine.

3. The method of killing weeds comprising applying to soil the phytotoxic amount of 2,4-dimethoxy-6-phenyl mercapto-s-triazine.

References Cited in the file of this patent
UNITED STATES PATENTS
2,936,227    Gysin et al. _____ May 10, 1960
FOREIGN PATENTS
610,403    Canada _____ Dec. 13, 1960
OTHER REFERENCES
Koopman: "Nieuwe Herbicide 1,3,5-Triazine Derivaten," 1957, pages 27 to 30 and 58 to 62.